Jan. 31, 1967 J. KOSAR ET AL 3,301,439
RADIATION DISINTEGRATING CAPSULE
Filed March 5, 1965
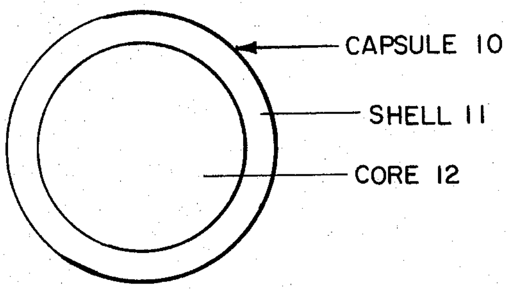
INVENTORS
JAROMIR KOSAR
GEORGE M. ATKINS JR.
By Peter F. Willig
ATTORNEY 3,301,439

RADIATION DISINTEGRATING CAPSULE

Jaromir Kosar, Beechhurst, N.Y., and George M. Atkins, Jr., Atlanta, Ga., assignors to Keuffel & Esser Company, Hoboken, N.J., a corporation of New Jersey Filed Mar. 5, 1965, Ser. No. 437,472

17 Claims. (Cl. 222—52)

The present invention relates to capsules and methods of using them, and more particularly refers to capsules and methods of disintegrating them by means of actinic radiation.

Capsules have heretofore been ruptured by crushing, by dissolving, or by melting with heat.

The present invention involves capsules containing an agent causing disintegration by exposure to electromagnetic radiation. The present methods of disintegration are particularly suitable for capsules in the micron range. These capsules preferably vary in diameter from 0.1 micron to 100 microns.

The present invention utilizes the sensitivity of certain compounds to ultraviolet, visible, and infrared radiation. Some of these compounds decompose on exposure to yield gases or vapors generating sufficient pressure to rupture the capsule walls and release the encapsulated material. Other compounds generate heat under the influence of actinic radiation to destroy the integrity of the capsules and thus release the encapsulated material. The compounds may be incorporated into the shell wall or into the core material of the capsule.

The method of the present invention for rupturing capsules is useful in applications where two reactants must be present but separate until needed. Typical uses are found in sensitizing, developing, fixing, and stabilizing photographic materials especially where complete dry processing is required. It is also evident that such a system is applicable in many non-photographic systems.

Therefore one object of the present invention is to provide capsules and methods for disintegrating capsules which overcome the disadvantages of the prior art.

Another object is to provide capsules and methods for disintegrating capsules by means of actinic radiation.

Another object is to provide capsules and methods for rupturing capsules by generating gas.

Another object is to provide methods and materials for melting capsules by internally generated heat.

Other objects will become apparent in the course of the following specification.

In the drawing, a capsule 10 comprises a shell 11 completely enclosing core 12.

The present invention will appear more clearly from the following detailed description when taken in connection with the accompanying drawing showing, by way of example, preferred embodiments of the inventive idea.

In principle, any compound which decomposes upon exposure to actinic radiation into a gas may be used for rupturing the capsules. Some of these compounds are discussed below and in the examples. Other compounds generate heat upon exposure to actinic radiation. These are also discussed below and in the examples.

Aromatic diazonium compounds decompose under the influence of ultraviolet and/or visible light exposure to yield nitrogen gas. Typical of such compounds are: 2,5-diethovy-benzene diazonium chloride; para-dimethyl-amino-benzene diazonium chloride; para-diethylamino-benzene diazonium chloride; 2,5-dichloro-4-benzylamino-benzene diazonium chloride; 2,5-dibutoxy-4-morpholino-benzene diazonium chloride; and 4-phenylamino-benzene diazonium chloride. Other photolytic diazonium compounds may be used.

Aromatic azido compounds containing at least one azido group ($-N_3$) decompose photolytically to produce nitrogen gas. Typical examples are: 4,4′-diazido-stilbene-2,2′-disulfonic acid and its sodium salt; 4,4′-diazidochalcone; and 2-azido-1,4-naphthalene-dienzene-sulfonamide.

Quinone-diazides such as benzoquinone-(1,4)-diazide-(4)-2-sulfonic acid-beta-naphthylamide decompose photolytically to yield nitrogen gas. Both ortho and para compounds are useful. Examples are: 2-diazo-1-naphthol-5-sulfonic acid ethylether; naphthoquinone-1,2-diazide-(2)-phenyl sulfone-(4); and the like.

Ferric salts of an organic dicarboxylic acid, such as ferric oxalate and ferric ammonium oxalate, decompose by the action of light to yield carbon dioxide.

Infrared absorbers may be used in the shell or in the core to generate sufficient heat by the conversion of actinic radiation to destroy the integrity of the capsule and thus release the encapsulated material. Typical infrared absorbers include carbon black and synthetic absorbers such as manganese complexes of azo compounds (U.S. 3,042,624). One such infrared absorber has an absorption range of 800 to 1,800 millimicrons with maximum absorptions at 930 and 1,450 millimicrons. It forms a dark green powder at the melting point of 180° C. (with decomposition). It is soluble in solvents such as acetone, chloroform, methanol, methylene chloride, and thus affords incorporation in a manner unlike that of carbon black.

The following examples further illustrate the present invention and are not intended to limit its scope.

*Example 1.*—Ethyl cellulose capsules containing the double salt of zinc chloride and para-dimethylamino-benzene diazonium chloride were prepared according to the method described in U.S. 3,111,407 issued to R. M. Lindquist.

(A)

| | | |
|---|---|---|
| Carbowax 550 (methoxy polyethylene glycol having a molecular weight of about 550) | ml | 11.1 |
| Water | ml | 36.3 |
| Para-dimethylamino-benzene diazonium chloride (zinc chloride double salt) | gm | 3.0 |
| Ferrous ammonium sulfate | gm | 1.0 |

(B)

| | | |
|---|---|---|
| Xylol | ml | 109.2 |
| Carbon tetrachloride | ml | 59.4 |
| Ethyl cellulose (46.4% ethoxyl) | gm | 10.0 |
| Emulsifier (Thixcin R vegetable oil) | gm | 0.5 |

The two solutions were heated to 35° C. Solution A was emulsified in Solution B using an air-powered stirrer. 93.8 ml. of carbon tetrachloride also at 35° C. were added to the emulsion. With continued stirring, 300 ml. naphtha (petroleum ether) at room temperature were added to cause coacervation. The mixture was cooled to 20° C. and filtered.

After being washed and dried, a portion of the capsules were placed on a white sheet of paper for several minutes. The portion was then moved to another area of the paper where they were covered with a heat-absorbing glass shield and exposed for several minutes to a 275-watt G.E. sunlamp at a distance of 12 inches. A thermometer placed beside the capsules registered temperatures lower than 29° C. at all times. The light source was removed, and the shield, thermometer, and capsules were removed from the paper. The paper was then saturated with potassium ferricyanide solution. Development of a blue ferrous ferricyanide in the position where the capsules were exposed showed that ferrous ion was released from the capsules. No color developed where the capsules had previously rested unexposed.

*Example 2.*—Para-dimethylamino-benzene diazonium chloride was replaced with 2,5-dibutoxy-4-morpholino-benzene diazoniam chloride to produce similar results.

*Example 3.*—Para-dimethylamino-benzene diazonium chloride of Example 1 was replaced with 4-phenylamino-benzene diazonium chloride to produce similar results.

*Example 4.*—Ethyl cellulose capsules containing an aromatic azido compound were prepared as in Example 1. The azido compound used was 4,4′-diazido stilbene-2,2′-disulfonic acid (sodium salt). The capsules were prepared as follows:

(A)

| | | |
|---|---|---|
| Carbowax 550 | ml | 11.1 |
| Water | ml | 36.3 |
| Azido compound | gm | 2.0 |
| Ferrous amonium sulfate | gm | 1.0 |

(B)

| | | |
|---|---|---|
| Xylol | ml | 109.2 |
| Carbon tetrachloride | ml | 59.4 |
| Ethyl cellulose (46.4% ethoxyl) | gm | 10.0 |
| Thixcin R | gm | 0.5 |

The two solutions were heated to 35° C. Solution A was emulsified in Solution B using an air-powered stirrer. 93.8 ml. of carbon tetrachloride also at 35° C. were added to the emulsion. With continued stirring, 300 ml. petroleum ether at room temperature were added to cause coacervation. The mixture was cooled to room temperature and filtered.

After being washed and dried, a portion of the capsules were placed on a white sheet of paper where they remained for several minutes. They were then moved to another area of the paper where they were covered with a heat-absorbing glass shield and exposed for several minutes to a 275-watt G.E. sunlamp at a distance of 12 inches. A thermometer placed beside the capsules gave a temperature reading of 25° C. throughout the exposure period. The light source was removed, and the heat shield, thermometer, and capsules were removed from the paper. The paper was then coated with potassium ferricyanide solution. Development of a blue ferrous ferricyanide in the position where the capsules were exposed showed that ferrous ion had been released from the capsules. No color developed where the capsules had rested unexposed.

*Example 5.*—The sodium salt of 4,4′-diazidostilbene-2,2′-disulfonic acid of Example 4 was replaced with 4,4′-diazidochalcone to produce similar results.

*Example 6.*—Ethyl cellulose capsules containing benzoquinone-(1,4)-diazide-(4)-2-sulfonic acid-beta-naphthylamide were prepared according to the method as described in Example 1.

(A)

| | | |
|---|---|---|
| Carbowax 550 | ml | 100.1 |
| Water | ml | 36.3 |
| Diazide compound | gm | 2.0 |
| Ferrous ammonium sulfate | gm | 1.0 |

(B)

| | | |
|---|---|---|
| Xylol | ml | 109.2 |
| Carbon tetrachloride | ml | 59.4 |
| Ethyl cellulose (46.4% ethoxyl) | gm | 10.0 |
| Thixcin R | gm | 0.5 |

The two solutions were heated to 35° C. Solution A was emulsified in Solution B using an air-powered stirrer. 93.8 ml. of carbon tetrachloride at 35° C. were added to the emulsion. With continued stirring, 300 ml. petroleum ether at room temperature were added to cause coacervation. The mixture was cooled to room temperature and filtered. After being washed and dried, a portion of the capsules was placed on a white sheet of paper where they remained in contact with the paper for several minutes. They were then moved to another area of the paper where they were covered by a heat-absorbing shield and exposed for several minutes to a 275-watt G.E. sunlamp at a distance of 12 inches. A thermometer placed beside the capsules gave a temperature reading of 25° C. throughout the exposure period. The light source was removed, and the shield, thermometer, and capsules were removed from the paper. The paper was then saturated with a solution of potassium ferricyanide. The development of a blue ferrous ferricyanide in the position where the capsules were exposed showed that ferrous ion had been released from the capsules. No color developed where the capsules had rested unexposed.

*Example 7.*—Casein capsules containing 2-diazo-1-naphthol-5-sulfonic acid ethylether were prepared according to the following method.

(A)

| | | |
|---|---|---|
| Casein | gm | 20 |
| Triethanolamine | ml | 2 |
| Sodium hydroxide solution (1.0 N) | ml | 100 |
| Water | ml | 400 |

(B)

| | | |
|---|---|---|
| Cottonseed oil | ml | 50 |
| Diazo compound | gm | 5 |
| Azo oil black dye (C.I. Solvent Black 12) | gm | 0.5 |

(C)

| | | |
|---|---|---|
| Hydrochloric acid (1.0 N) | ml | 150 |
| Water | ml | 100 |
| Sodium sulfate | gm | 20 |

Solutions A and B were heated to 60° C. and placed in a Waring blender (Model CB–4). The blender was operated for three minutes at 14,000 r.p.m. During the last minute, Solution C at room temperature was added. The capsules were filtered from the mixture.

A portion of the capsules was blotted on filter paper and placed on a sheet of white paper where they remained for several minutes. They were then moved to another area of the paper where they were covered with a heat-absorbing glass shield and exposed for several minutes to a 275-watt G.E. sunlamp at a distance of 12 inches. A thermometer placed beside the capsules registered a temperature of 27° C. throughout the exposure period. When the light source was removed, dyed oil spots could be seen on the paper around the capsules but not where the capsules had rested unexposed.

*Example 8.*—Albumen capsules containing naphthoquinone-1,2-diazide(2)-phenyl sulfone-(4) were prepared according to the following method: 10 gm. of egg albumen were dissolved in 200 ml. cool water and 7 drops of 30% silicone anti-foaming agent were added. The albumin sol and 30 ml. cottonseed oil containing 3 gm. of the diazide and 0.5 gm. azo oil black dye (C.I. Solvent Black 12) were placed in a Waring blender (Model CB–4). The blender was then operated at 17,000 r.p.m. for three and one-half minutes. After two minutes of operation, 500 ml. boiling water were added to the top of the blender. The blender was then stopped and the mixture was filtered.

A portion of the capsules were blotted on filter paper and then placed in a designated area on a sheet of white paper where they remained for several minutes. They were then moved to another area of the paper where they were covered with a heat-absorbing glass shield and exposed to a 275-watt G.E. sunlamp at a distance of 12 inches. A thermometer placed between the infrared-absorbing glass and the paper beside the capsules registered a temperature of 27° C. throughout the exposure period. When the light source was removed, dyed oil spots could be seen on the paper around the capsules. Capsules which have been similarly blotted and placed on white paper, but not exposed showed no signs of dyed oil.

*Example 9.*—Ethyl cellulose capsules containing ferric ammonium oxalate were prepared as follows:

(A)

| | | |
|---|---|---|
| Carbowax 550 | ml | 11.1 |
| Water | ml | 36.3 |
| Ferric ammonium oxalate | gm | 35.0 |

(B)

| | | |
|---|---|---|
| Xylol | ml | 109.2 |
| Carbon tetrachloride | ml | 59.4 |
| Ethyl cellulose (46.4% ethoxyl) | gm | 10.0 |
| Thixcin R | gm | 0.5 |

The two solutions were heated to 35° C. Solution A was emulsified in Solution B using an air-powered stirrer. 93.8 ml. of carbon tetrachloride at 35° C. were added to the emulsion. With continued stirring, 300 ml. of petroleum ether at room temperature were added to cause coacervation. The mixture was cooled to room temperature and filtered.

After being blotted nearly dry, a portion of the capsules was placed in a designated area on a white sheet of paper and allowed to dry further. They were then moved to another area of the paper where they were covered with a heat-absorbing glass shield and exposed for several minutes to a 275-watt G.E. sunlamp at a distance of 12 inches. A thermometer was placed between the infrared-absorbing glass and the paper beside the capsules. The temperature ranged between 25° C. and 28° C throughout the exposure period. The light source was removed, and the shield, thermometer, and capsules were removed from the paper. The paper was then saturated with a solution of potassium ferrocyanide. The development of a deep blue color (ferric ferrocyanide) in and around the position where the capsules were exposed indicated that ferric ion had been released from the capsules. The capsules almost appeared to blister during exposure. No color developed where the capsules had been dried unexposed.

*Example 10.*—Two batches of gelatin capsules were prepared as follows:

(A)

| | | |
|---|---|---|
| Water | ml | 180 |
| Pigskin gelatin | gm | 20 |
| 30% silicone anti-foaming agent | drops | 3 |

(B)

| | | |
|---|---|---|
| Cottonseed oil | ml | 40 |
| Carbon tetrabromide | gm | 2 |
| Soluble infrared absorber | gm | 0.7 |

(C)

| | | |
|---|---|---|
| Water | ml | 80 |
| Sodium sulfate | gm | 20 |

(D)

| | | |
|---|---|---|
| Water | ml | 1,000 |
| Sodium sulfate | gm | 70 |

Solutions A and B were heated to 50° C. and placed in a Waring blender (Model CB–4). An oil-in-water emulsion was prepared by operating the blender at 14,000 r.p.m.'s Solution C at room temperature was then added to cause coacervation, and the entire contents of the blender were added to Solution D which had been cooled to 14° C.

Samples from two batches with and without the soluble infrared absorber were placed on watch glasses and exposed to a 250-watt G.E. reflector drying lamp. The sample containing the infrared absorber melted completely before the sample containing no absorber began to melt. To provide a better comparison, a sample of capsules with absorber was placed in one test tube and a sample without absorber was placed in an identical test tube. Thermometers were placed beside the capsules in each of the test tubes. The two tubes were then laid down side by side and exposed to the drying lamp at a distance of six inches. The capsules containing the infrared absorber began to melt in less than half a minute of exposure and melted completely before the capsules with no absorber began to melt. In addition, the thermometer inside the tube with the absorber-container capsules registered 34° C. when the capsules in the tube were completely melted, while in the other test tube, the temperature was 51° C. when the capsules were completely melted.

*Example 11.*—Two more batches of gelatin capsules were prepared as in the previous example. The only difference in preparation was in the oil solution used. In one batch 40 ml. of cottonseed oil were encapsulated. In the other 40 ml. of cottonseed oil in which finely divided carbon black has been dispersed were encapsulated. The carbon black acted as an infrared absorber. When tested as in Example 10, the capsules containing the carbon black began to melt in less than half the time it took the capsules without the absorber to begin melting.

It should be evident that both water-in-oil emulsions and oil-in-water emulsions may be used to prepare the capsules. The radiation-sensitive element may be in the core or in the shell material. When it is in the core, the shell must be substantially radiation-transparent. When it is in the shell, it must not interfere with the contrast to be obtained. Thus, for example, carbon black dispersed in the shell material will provide little contrast if the core material contains a black dye. Gas-producing radiation-sensitive elements include diazonium compounds, azido compounds, diazide compounds, and decarboxylating compounds. Heat-producing radiation-sensitive elements include organic complexes and pigments such as carbon black. The core materials may be solid or liquid and they can be dispersed in solid or liquid media. For example, cottonseed oil serves as a liquid medium and methoxy polyethylene glycol serves as a liquifiable solid. Shell materials may be rupturable, fusible or both, as long as the integrity of the shell can be destroyed by the radiation-activated element. Many suitable materials are found in the encapsulation art.

It is apparent that the described examples are capable of many variations and modifications. All such variations and modifications are to be found within the scope of the present invention.

What is claimed is:

1. A capsule comprising:
a core material;
a radiation-transparent shell completely enclosing the core material; and
a radiation-sensitive shell-disintegrating agent in the core material.

2. A capsule comprising:
a core material;
an infrared radiation-transparent shell completely enclosing the core material; and
an infrared radiation-sensitive shell-disintegrating agent in the core material.

3. A capsule comprising:
a core material;
a shell completely enclosing the core material; and
a radiation-sensitive shell-disintegrating agent operatively disposed with respect to the shell, said agent being capable of rupturing the shell by generating gas.

4. A capsule comprising:
a core material;
a shell completely enclosing the core material; and
a radiation-sensitive shell-disintegrating agent operatively disposed with respect to the shell, said agent being a diazonium compound.

5. A capsule comprising:
a core material;
a shell completely enclosing the core material; and
a radiation-sensitive shell-disintegrating agent operatively disposed with respect to the shell, said agent being an azido compound.

6. A capsule comprising:
a core material;
a shell completely enclosing the core material; and
a radiation-sensitive shell-disintegrating agent operatively disposed wtih respect to the shell, said agent being a diazide compound.

7. A capsule comprising:
a core material;

a shell completely enclosing the core material; and
a radiation-sensitive shell-disintegrating agent operatively disposed with respect to the shell, said agent being a decarboxylating compound.

8. A capsule comprising:
a core material;
a shell completely enclosing the core material; and
a radiation-sensitive shell-disintegrating agent operatively disposed with respect to the shell, said agent being capable of melting the shell by internally generated heat.

9. A capsule comprising:
a core material;
a shell completely enclosing the core material; and
a radiation-sensitive shell-disintegrating agent operatively disposed with respect to the shell, said agent being carbon black.

10. A capsule comprising:
a core material;
a shell completely enclosing the core material; and
a radiation-sensitive shell-disintegrating agent operatively disposed with respect to the shell, said agent being an organic complex infrared radiation absorber.

11. A capsule comprising:
a core material;
a shell completely enclosing the core material; and
a photosensitive gas-producing diazonium compound intimately admixed with the core material.

12. A capsule comprising:
a core material;
a casein shell completely enclosing the core material; and a photosensitive gas-producing diazonium compound intimately admixed with the core material.

13. A capsule comprising:
a core material;
an ethyl cellulose shell completely enclosing the core material; and
a photosensitive gas-producing diazonium compound intimately admixed with the core material.

14. A capsule comprising:
a core material;
a shell completely enclosing the core material; and
photosensitive gas-producing ferric oxalate in the core material.

15. A capsule comprising:
a core material;
a shell completely enclosing the core material; and
an infrared radiation absorber in the core material.

16. A capsule comprising:
a core material;
a shell completely enclosing the core material; and
carbon black intimately admixed in the core material.

17. A capsule comprising:
a core material;
a shell completely enclosing the core material; and
an organic complex infrared radiation absorber intimately admixed in the core material.

References Cited by the Examiner

UNITED STATES PATENTS 2,939,009 5/1960 Tien ________________ 96—75

ROBERT B. REEVES, *Primary Examiner.*

HADD S. LANE, *Examiner.*